(12) United States Patent
Conover

(10) Patent No.: US 10,606,628 B2
(45) Date of Patent: *Mar. 31, 2020

(54) SYSTEMS AND METHODS FOR MODIFYING AN OPERATING SYSTEM FOR A VIRTUAL MACHINE

(71) Applicant: VMware, Inc., Palo Alto, CA (US)

(72) Inventor: Matthew Conover, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/603,025

(22) Filed: May 23, 2017

(65) Prior Publication Data

US 2017/0262308 A1    Sep. 14, 2017

Related U.S. Application Data

(63) Continuation of application No. 14/880,906, filed on Oct. 12, 2015, now Pat. No. 9,672,061, which is a continuation of application No. 13/588,699, filed on Aug. 17, 2012, now Pat. No. 9,158,561.

(60) Provisional application No. 61/524,947, filed on Aug. 18, 2011.

(51) Int. Cl.
| | |
|---|---|
| *G06F 9/44* | (2018.01) |
| *G06F 9/455* | (2018.01) |
| *G06F 8/65* | (2018.01) |
| *G06F 8/61* | (2018.01) |
| *G06F 9/445* | (2018.01) |

(52) U.S. Cl.
CPC ............ *G06F 9/45558* (2013.01); *G06F 8/65* (2013.01); *G06F 9/455* (2013.01); *G06F 9/45533* (2013.01); *G06F 8/61* (2013.01); *G06F 9/44505* (2013.01); *G06F 2009/4557* (2013.01); *G06F 2009/45583* (2013.01)

(58) Field of Classification Search
CPC ................. G06F 9/455–45558; G06F 8/65–76
USPC ........................ 717/168–173; 718/100–108
See application file for complete search history.

(56) References Cited

U.S. PATENT DOCUMENTS

| | | | |
|---|---|---|---|
| 7,448,034 B2 | 11/2008 | Anderson et al. | |
| 7,653,794 B2 | 1/2010 | Michael et al. | |
| 7,779,091 B2 | 8/2010 | Wilkinson et al. | |
| 7,802,248 B2 | 9/2010 | Broquere et al. | |
| 7,870,153 B2 | 1/2011 | Croft et al. | |
| 8,010,701 B2 | 8/2011 | Wilkinson et al. | |
| 8,171,201 B1 * | 5/2012 | Edwards, Sr. | G06F 9/45558 |
| | | | 711/112 |

(Continued)

OTHER PUBLICATIONS

Satyam B. Vaghani: "Virtual Machine File System"—VMware, Inc. ACM SIGOPS Operating Systems Review vol. 44 Issue 4, Dec. 2010 pp. 57-70.*

(Continued)

*Primary Examiner* — Francisco J Aponte

(57) ABSTRACT

Systems, methods, and software are described herein for operating a data management system, including executing an attached application and application data on a first virtual machine running a first operating system, separating the attached application and application data from the first virtual machine, and dynamically attaching the application and application data to a second virtual machine running an updated version of the first operating system.

20 Claims, 6 Drawing Sheets

(56) References Cited

U.S. PATENT DOCUMENTS

| | | | |
|---|---|---|---|
| 8,205,194 B2* | 6/2012 | Fries | G06F 8/65 |
| | | | 717/168 |
| 8,286,238 B2* | 10/2012 | Durham | G06F 8/656 |
| | | | 726/22 |
| 8,290,901 B2 | 10/2012 | Whitehead et al. | |
| 8,434,093 B2 | 4/2013 | Larimore et al. | |
| 8,443,365 B2 | 5/2013 | Kumar | |
| 8,578,376 B2 | 11/2013 | Natchadalingam et al. | |
| 8,782,632 B1 | 7/2014 | Chigurapati et al. | |
| 9,047,313 B2* | 6/2015 | Baron | G06F 9/45558 |
| 9,141,381 B2 | 9/2015 | Siddegowda | |
| 10,055,309 B1* | 8/2018 | Samad | G06F 11/1464 |
| 2006/0184937 A1* | 8/2006 | Abels | G06F 8/65 |
| | | | 718/1 |
| 2007/0089111 A1* | 4/2007 | Robinson | G06F 21/53 |
| | | | 718/1 |
| 2007/0192329 A1 | 8/2007 | Croft et al. | |
| 2008/0034071 A1 | 2/2008 | Wilkinson et al. | |
| 2008/0184225 A1* | 7/2008 | Fitzgerald | G06F 9/455 |
| | | | 718/1 |
| 2008/0222160 A1 | 9/2008 | MacDonald et al. | |
| 2008/0244028 A1 | 10/2008 | Le et al. | |
| 2008/0288631 A1 | 11/2008 | Faisal et al. | |
| 2008/0307414 A1 | 12/2008 | Alpem et al. | |
| 2009/0228883 A1* | 9/2009 | Gebhart | G06F 9/45533 |
| | | | 718/1 |
| 2009/0260007 A1* | 10/2009 | Beaty | G06F 9/5077 |
| | | | 718/1 |
| 2009/0276774 A1* | 11/2009 | Kinoshita | G06F 21/6218 |
| | | | 718/1 |
| 2010/0042994 A1 | 2/2010 | Vasilevsky et al. | |
| 2010/0122248 A1* | 5/2010 | Robinson | G06F 9/485 |
| | | | 718/1 |
| 2010/0235831 A1 | 9/2010 | Dittmer | |
| 2010/0235832 A1* | 9/2010 | Rajagopal | G06F 3/0605 |
| | | | 718/1 |
| 2010/0257326 A1* | 10/2010 | Otani | G06F 11/1451 |
| | | | 711/162 |
| 2010/0275204 A1 | 10/2010 | Kamura et al. | |
| 2011/0040812 A1 | 2/2011 | Phillips | |
| 2011/0047340 A1* | 2/2011 | Olson | G06F 11/1456 |
| | | | 711/162 |
| 2011/0061049 A1* | 3/2011 | Kobayashi | G06F 3/0617 |
| | | | 718/1 |
| 2011/0119669 A1* | 5/2011 | McRae | G06F 9/45558 |
| | | | 718/1 |
| 2011/0185292 A1 | 7/2011 | Chawla et al. | |
| 2011/0185355 A1 | 7/2011 | Chawla et al. | |
| 2011/0265076 A1 | 10/2011 | Thorat et al. | |
| 2012/0005672 A1 | 1/2012 | Cervantes et al. | |
| 2012/0110274 A1 | 5/2012 | Rosales et al. | |
| 2012/0158803 A1* | 6/2012 | Kandasamy | G06F 9/5077 |
| | | | 707/822 |
| 2012/0174095 A1 | 7/2012 | Natchadalingam et al. | |
| 2012/0226885 A1* | 9/2012 | Mori | G06F 3/0605 |
| | | | 711/170 |
| 2012/0266156 A1* | 10/2012 | Spivak | G06F 9/5055 |
| | | | 717/172 |
| 2012/0266162 A1* | 10/2012 | Baron | G06F 9/45558 |
| | | | 718/1 |
| 2013/0047160 A1* | 2/2013 | Conover | G06F 8/65 |
| | | | 718/1 |
| 2014/0282538 A1* | 9/2014 | Conover | G06F 9/45558 |
| | | | 718/1 |

OTHER PUBLICATIONS

Rajkumar Buyya, James Broberg and Andrzej Goscinski: "Cloud Computing Principles and Paradigms"; 2011 by John Wiley & Sons, Inc.*

* cited by examiner

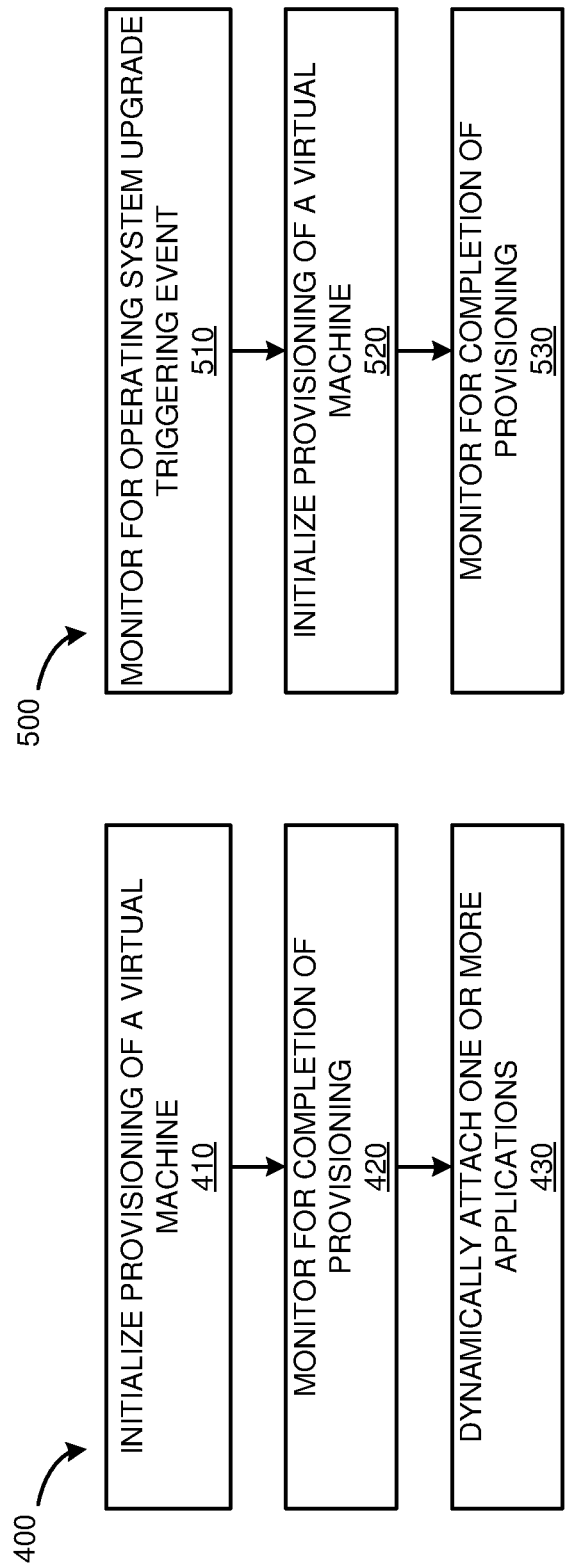

SYSTEMS AND METHODS FOR MODIFYING AN OPERATING SYSTEM FOR A VIRTUAL MACHINE

RELATED APPLICATIONS

This application is a continuation of, and claims priority to, U.S. application Ser. No. 14/880,906, filed on Oct. 12, 2015, and entitled "SYSTEMS AND METHODS FOR MODIFYING AN OPERATING SYSTEM FOR A VIRTUAL MACHINE," which itself is a continuation of, and claims the benefit of and priority to, U.S. application Ser. No. 13/588,699, filed on Aug. 17, 2012, and entitled "SYSTEMS AND METHODS FOR MODIFYING AN OPERATING SYSTEM FOR A VIRTUAL MACHINE," which claims the benefit of and priority to U.S. Provisional Patent Application 61/524,947, titled "SYSTEMS AND METHODS FOR MODIFYING AN OPERATING SYSTEM OF A VIRTUAL MACHINE", filed Aug. 18, 2011, all of which are hereby incorporated by reference in their entirety.

TECHNICAL BACKGROUND

A "virtual machine" is a virtualized copy of a computer system, with virtual hardware (including disk controller, network card, etc.). Frequently, running within the virtual machine is a full operating system. These virtual machines run on a physical host server known as a hypervisor. The hypervisor abstracts the physical hardware of the host server so that the virtual machine sees virtual hardware regardless of what the underlying hardware includes. The storage volumes that appear within the virtual machine are virtualized storage volumes provided by the hypervisor. The storage volumes visible from within the virtual machine can come from multiple sources.

Operating systems on the virtual machines frequently need to be updated or upgraded. This could be due to a software bug (an error in the software), a security vulnerability (that can be exploited by a hacker or malicious software), or a performance enhancement. In such a scenario, the administrator faces a challenge. The administrator would like to update or upgrade the operating system to get the benefits of the latest version, but would also prefer a short downtime for the mission critical application. Stopping the application means that customers will be denied service during the downtime while the operating system is being upgraded. Due to limitations of existing solutions, administrators are often forced to make operating system upgrades or updates during nights or weekends to minimize customer impact.

Overview

In some examples, a method of operating a data management system includes placing an application and its data on a storage volume, utilizing a hypervisor executing a virtual machine to mount (attach) the storage volume into a particular virtual machine, and later unmount (detach) the storage volume and attach it to a different virtual machine running the same or a similar operating system as a method to upgrade the operating system with minimal or no downtime for the application.

In some examples, a method of operating a data management system is disclosed. The method comprises initializing provisioning of a virtual machine, monitoring for completion of the provisioning of the virtual machine, and in response to completion of the provisioning of the virtual machine, dynamically attaching at least one application to the virtual machine.

In some examples, a computer-readable medium comprises program instructions stored on the computer-readable medium for operating a data management system. The program instructions, when executed by the data management system, direct the data management system to initialize provisioning of a virtual machine, monitor for completion of the provisioning of the virtual machine, and in response to completion of the provisioning of the virtual machine, dynamically attach at least one application to the virtual machine.

In some examples, a computer-readable medium comprises program instruction stored on the computer-readable medium for operating a data management system. The program instructions, when executed by the data management system, direct the data management system to monitor for an operating system upgrade triggering event for an initial virtual machine, and upon detection of the operating system upgrade triggering event, initialize provisioning of a new virtual machine and monitor for completion of the provisioning of the new virtual machine.

BRIEF DESCRIPTION OF THE DRAWINGS

FIG. 4 illustrates the operation of a data management system according to one example.

FIG. 5 illustrates the operation of a data management system according to one example.

DETAILED DESCRIPTION

Systems and methods are provided herein for modifying an operating system that executes a primary application. In particular, the operating system may be updated or upgraded in such as manner as to reduce the downtime of the primary application executing on the operating system. In at least one example, the operating system is separated from the primary application and application data associated with the primary application. More specifically, the primary application and application data may be attached to a virtual machine that is running the operating system using a hypervisor.

Accordingly, the original operating system running the primary application may be described as operating in a first virtual machine environment. When the operating system is to be updated or upgraded, a similar operating system may be loaded in a second virtual machine environment and updated (or upgraded) as desired while the primary application continues to run in the first virtual machine environment. Once the operating system is updated or upgraded, the primary application and any associated application data may be dynamically attached to the second virtual machine environment running the newer operating system. In at least one example, the primary application and any associated application data may be detached from the first virtual machine environment prior to being dynamically attached to second virtual machine environment. In another example, the primary application (excluding any associated application data) may be started on the second virtual machine before detaching the associated data of the primary application from the first virtual machine. Once the associated data has been detached from the first virtual machine and attached to the second virtual machine, the primary application running in the first virtual machine is no longer needed. The primary application in the first virtual machine may be terminated before or after detaching associated application data.

Figure 1A:
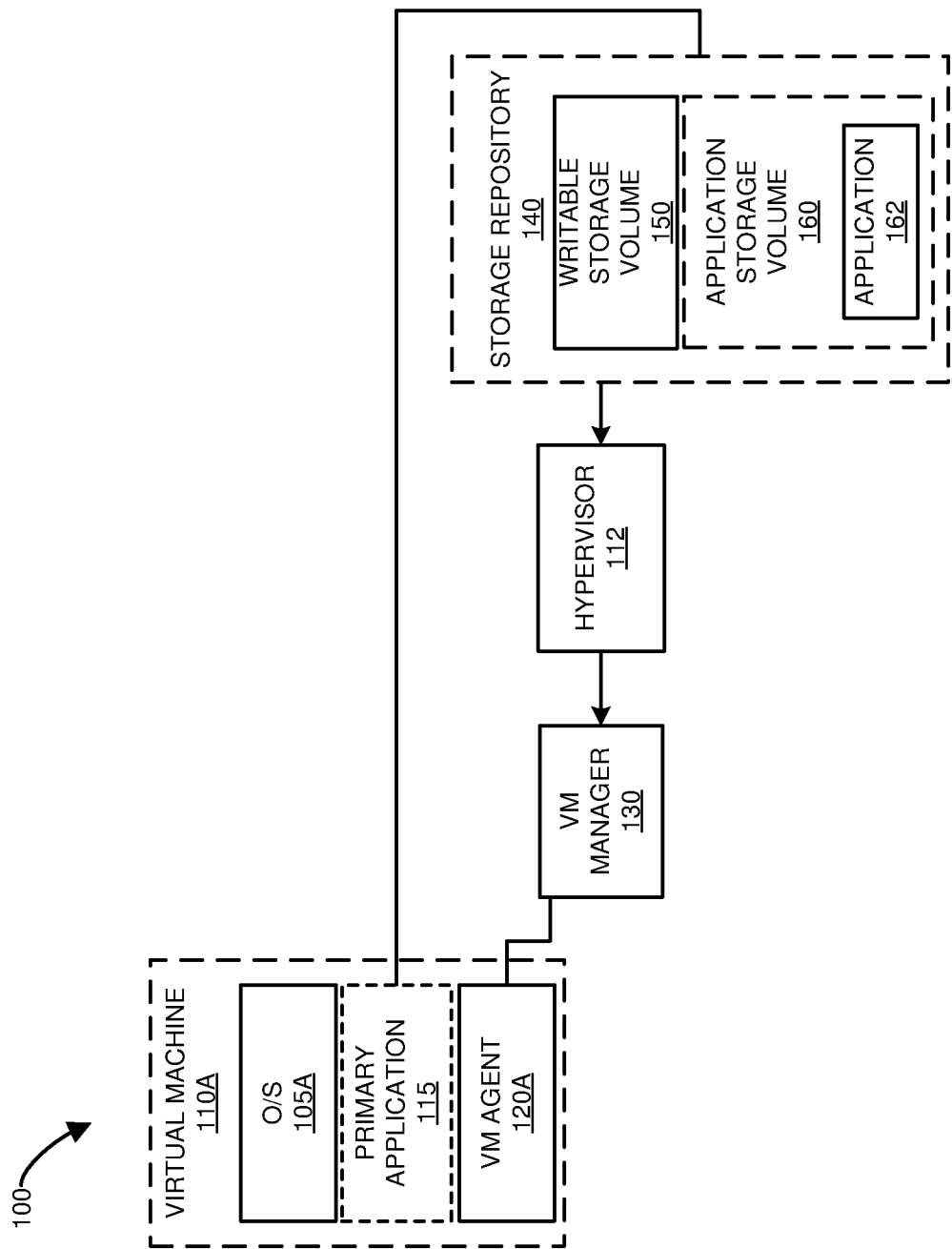
FIG. 1A illustrates a data management system according to one example.
Figure 1B:
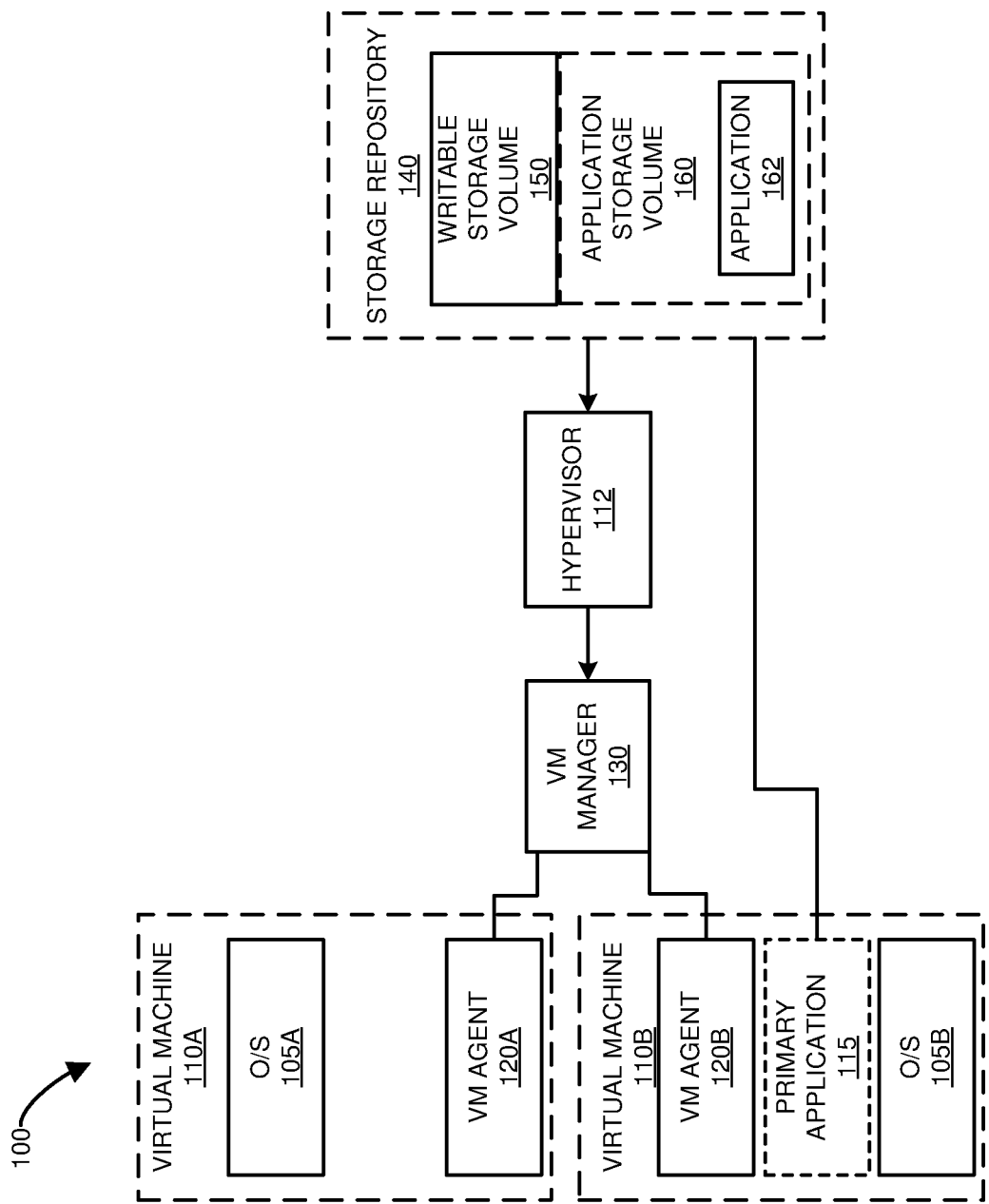
FIG. 1B illustrates a data management system according to one example.

FIG. 1A illustrates a system 100 to load data and/or applications to one virtual machine 110A that is attached by a hypervisor 112. FIG. 1B illustrates a system 100 to load data and/or applications to one or more virtual machines 110A, 110B that are attached by a hypervisor 112. Although shown as a single computing device, the hypervisor 112 may operate on as many computing devices and/or in as many environments as desired. The system 100 may be further configured to modify an operating system 105A running on the first virtual machine 110A in which the operating system 105A is running a primary application 115 in at least one example, the primary application 115 collectively describes applications loaded into the first virtual machine 110A using volumes attached by the hypervisor 112 (even though the applications may be located on a different storage volume than the associated application data). In particular, in at least one example, the system 100 includes a VM agent 120A running within the first virtual machine 110A.

The VM agent 120A is configured to interact with a VM manager 130. The VM manager 130 determines which of various storage volumes in a storage repository 140, including writable storage volume(s) 150 and application volume(s) 160, should be attached to the virtual machine 110A. The VM manager 130 then directs a request to a hypervisor 150 to attach the selected storage volumes 150, 160 to the target virtual machine 110A. In at least one example, the hypervisor 112 abstracts the physical hardware of the host computing device so that the virtual machine sees virtual hardware regardless of what the underlying hardware actually is. The application storage volume 160 is mounted by the hypervisor 112 to thereby allow the virtual machines 110A, 110B to access the application 162 on the application storage volume 160 through the hypervisor 112 and thus enable virtual machines 110A, 110B to run primary application 115.

As shown in representatively in FIG. 1A, the attached storage volumes, and primary application 115 in particular, may then be attached to the target virtual machine 110A. The primary application 115 is shown within the target virtual machine 110A to emphasize the attachment of the primary application 115 to the virtual machine 110A, though it will be appreciated that the primary application 115 may not actually be transferred into the target virtual machine 110A.

Such a configuration may allow the system to update or upgrade the operating system 105A while minimizing the downtime of the primary application 115. As illustrated in FIG. 1B, to update or upgrade the operating system 105A an operating system 105B is loaded in a second virtual machine 110B. The operating system 105B may initially be substantially similar to the operating system 105A running in virtual machine 110A, The operating system 105B may then be updated or upgraded as desired. While the operating system 105B is being updated or upgraded, the operating system 105A in the first virtual machine 110A may continue running the primary application 115.

Once the system 100 has finished updating or upgrading the operating system 110B, the primary application 115 and its data are detached from the first virtual machine 110A, which is running the older version of the operating system 105A, and attached to the second virtual machine 110B, which is running a newer version of the operating system 110B. The primary application 115 is then continued in its previous state (or restarted if desired) so that the primary application 115 operates with minimal or no downtime.

Figure 2:
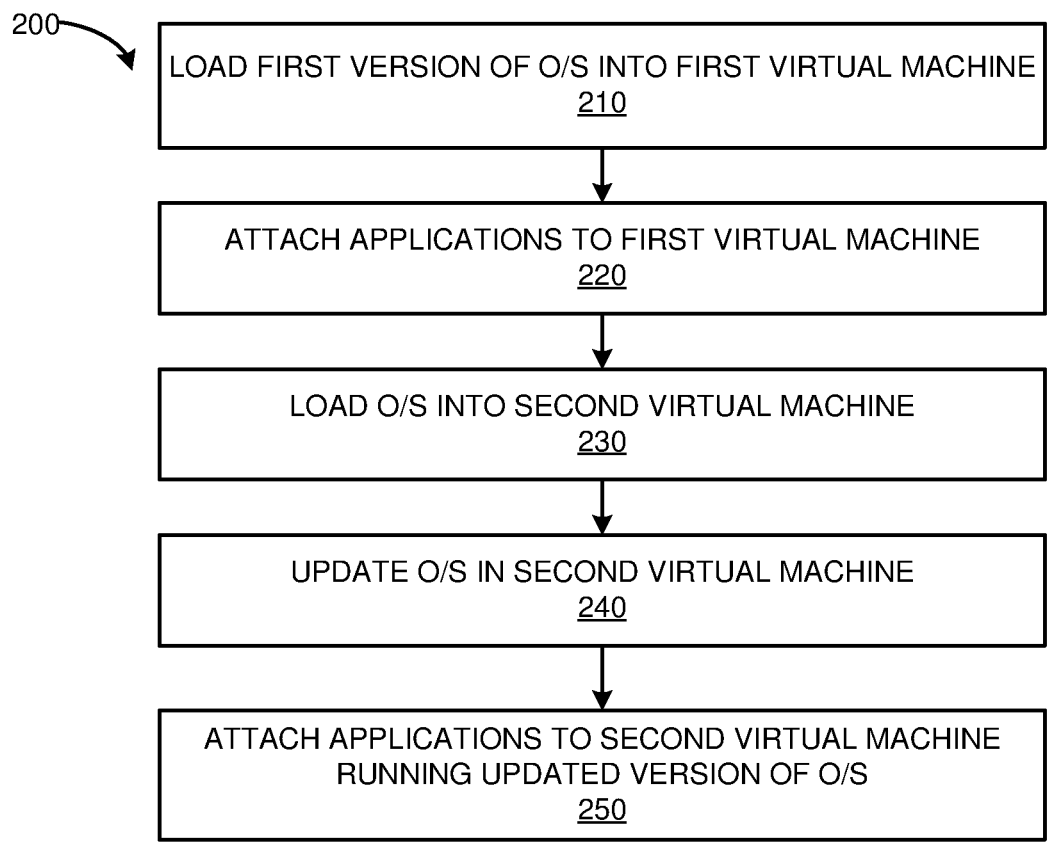
FIG. 2 illustrates the operation of a data management system according to one example.

FIG. 2 is a flowchart illustrating a method 200 for updating or upgrading an operating system. As shown in FIG. 2, the method begins at step 210 by loading a first version of an operating system in a first virtual machine environment. As seen at step 220, the method also includes attaching one or more applications to the first virtual machine environment.

Attaching the application(s) to the first virtual machine environment may include starting a VM agent. The VM agent may cooperate with a VM manager to identify volumes to be attached to the target virtual machine, including the applications. Thereafter, the selected volumes are dynamically attached to the target virtual machine.

At step 230, a similar version or the same of the operating system running in the first virtual machine is then loaded into a second virtual machine. Moreover, the second virtual machine could even be a cloned copy of the first virtual machine. The operating system is then updated or upgraded in the second virtual machine at step 240. Once the operating system is updated or upgraded, the application(s) may then be attached to the second virtual machine that is now running the updated or upgraded operating system at step 250. In at least one example, the application may be dynamically detached from the first virtual machine prior to being attached to the second first virtual machine.

Figure 3:
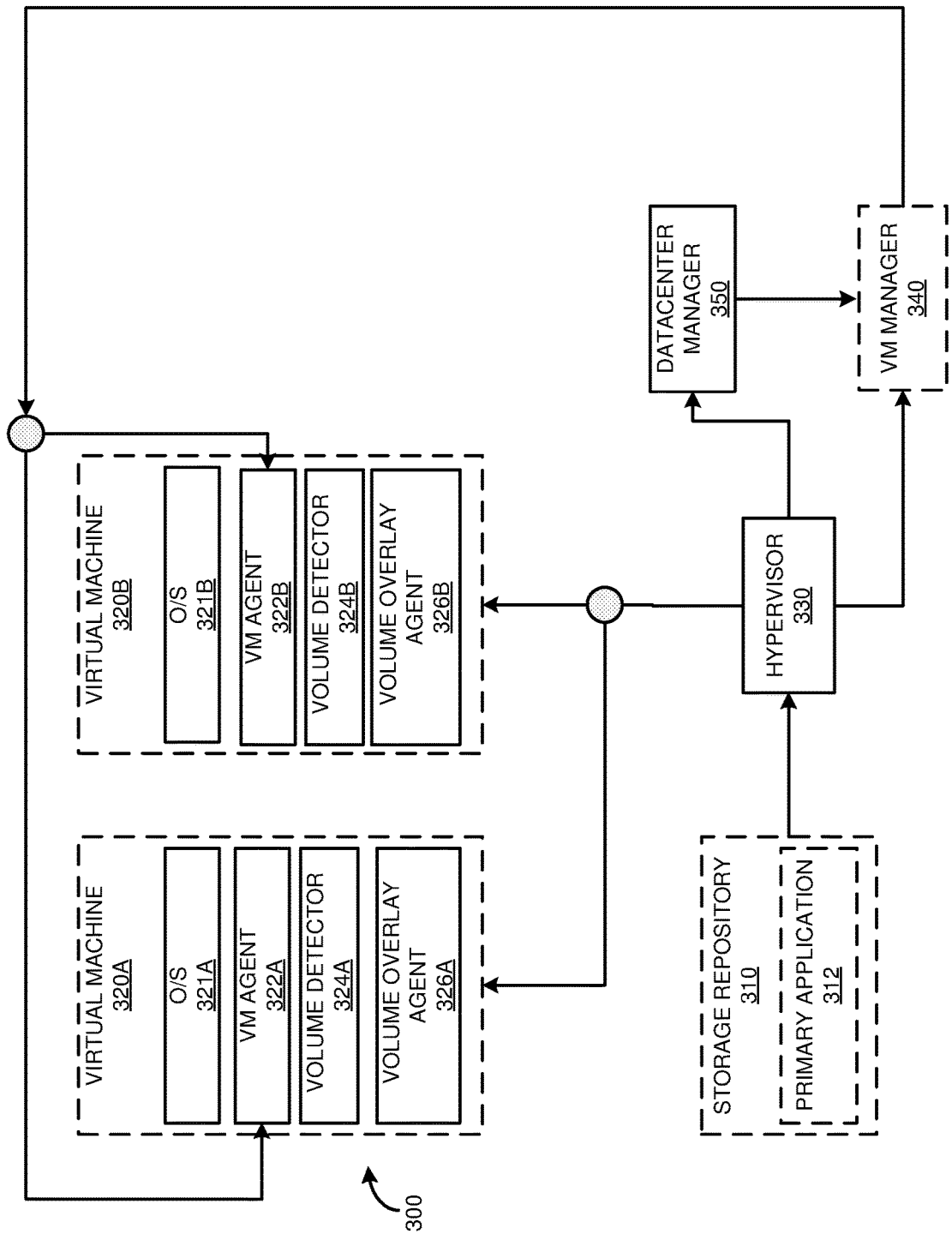
FIG. 3 illustrates a data management system according to one example.

FIG. 3 illustrates a system 300 that includes storage repository 310, a plurality of virtual machines 320A-320B executed by a hypervisor 330 or collection of hypervisors, and a virtual machine manager (VM manager) 340. In the illustrated example, operating systems 321A, 321B are each able to run a primary application 312 from the storage repository 310 when the primary application 312 is attached to the corresponding virtual machines 320A, 320B. VM agents 322A-322B running inside the virtual machines 320A-320B contact the VM manager 340 to request the hypervisor 330 to dynamically attach the primary application 312 from the storage repository 310. The VM agents 322A-322B, in various embodiments, may be a Windows service, a Unix daemon, or a script.

In one example, the VM manager 340 may be a part of the VM agent 322A itself. In other examples, the VM manager 340 may reside on a separate physical computer or a separate virtual machine that the VM agent 322A communicates with over a network.

The VM manager 340 may be responsible for attaching the primary application 312 to the appropriate virtual machines 320A, 320B. For example, when the system 300 updates or upgrades the operating system 321A on the virtual machine 320A, the system loads a similar operating system 321B onto another virtual machine 320B. The operating system 321B is then updated or upgraded. The VM manager 340 then causes the hypervisor 330 to detach the primary application from the virtual machine 320A running the older operating system 321A and to attach the primary application 312 to the virtual machine 320B running the updated or upgraded operating system 321B.

In particular, attached volumes described above may contain a file system with files and registry keys. The registry keys can be stored in a file or directory located on the attached volume. In one embodiment, this file format can be a one or more registry hive files (just as the HKEY_CURRENT_USER registry hive is a file named ntuser.dat located within the user's profile). In another embodiment, the registry keys could be represented as a hierarchy in set of directories and files (for example, one folder for each registry key and one or more files for each registry value).

In one embodiment, VM agents 322A-322B shown in FIG. 3 can detect when the volume has been attached and enumerate the registry keys on the volume (whether represented as a hive or a set of directories and files on the volume). The VM agent will look for known load points, such as HKEY_LOCAL_MACHINE\CurrentControlSet\Services, to locate programs, services, and drivers to be started. Using this method, installed applications, services, and drivers can be automatically loaded and launched as soon as the volume on which they are located is attached. This process of locating programs, services, and drivers to be launched by the VM agents mimics what the operating system would normally do upon starting up. Thus, when a user logs in, all of the programs, services, and drivers configured located on the volumes attached for a given user will be made available as if installed traditionally within the virtual machine. In one embodiment, a driver (a mini-filter driver or a file system filter driver, familiar to those skilled in the art) will detect attempts to write to non-persistent file systems (such as the C: \ drive) and will redirect the access to an attached, writable volume dedicated to the user.

The VM manager 340 could directly request the primary application 312 to be attached to the virtual machine 320A by connecting to the hypervisor 330 (such as VMware ESX server). The VM manager 340 could indirectly request the primary application 312 to be attached to the virtual machine 320A by connecting to a virtual datacenter manager 350 responsible for managing several hypervisors (such as a VMware vCenter server).

In at least one example, each of the virtual machines 320A-320B may include a volume detector 324A-324B respectively. The volume detector 324A-324B can be configured to detect when a new storage volume has been attached to the virtual machine 320A-320B. In one embodiment, this can be a file system filter driver. In another embodiment, this may be a file system mini-filter driver. In another embodiment, this can be a Windows service configured to detect when new storage devices have been attached. Once a new storage volume has been detected, a volume overlay software agent will be invoked (the "volume overlay agents 326A-326B"). The volume overlay agents 326A-326B may be part of the volume detectors 324A-324B or may be a separate driver as shown. Each of the volume overlay agents 326A-326B is responsible for exposing the data and applications contained in the storage repository 310 and making it available to the corresponding virtual machine 320A-320B.

The volume overlay agents 326A-326B may accomplish this by overlaying the content (such as files and registry keys) on top of the existing virtual machines 320A-320C so that the content can be seamlessly integrated into the virtual machine environments. In addition, if one or more applications contained in a storage volume are meant to start automatically, then the VM agents 322A-322B can enumerate the contents of the volume and automatically start the relevant services or drivers. For example, the VM agent can enumerate all Start registry values to look for services contained in the KEY_LOCAL_MACHINE\SYSTEM\CurrentControlSet\Services subtree that should be automatically started and invoke the relevant APIs (such as ZwLoadDriver and StartService).

The VM agents 322A-322B are also configured to terminate upon a specific triggering event ("detach-triggering event"). Detach-triggering events include a VM being powered off or a user logging off. When a detach-triggering event occurs, the VM agent contacts the VM manager to report the detach-triggering event. In the same manner outlined in the aforementioned process of handling the attaching event, the VM manager may then directly or indirectly request the hypervisor 330 to detach the storage volume from the corresponding virtual machine 320A-320B. To this point, attachment of the application storage volumes has been discussed generally. In at least one example, once a user logs into a virtual machine, storage will be dynamically attached to the virtual machine without the need to reboot the virtual machine. Once the storage is attached to the virtual machine, the storage will be directly accessible from within the virtual machine. This enables a non-persistent virtual machine to function as if it is a persistent virtual machine.

The storage dynamically attached to the virtual machine utilized by this invention can be in any form supported by the hypervisor and operating system of the virtual machine. The storage dynamically attached to the virtual machine may contain multiple partitions, volumes, and file systems. Storage concepts such as partitions, volumes, and file systems are well-known to skilled artisans and outside the scope of this invention.

In one embodiment, the storage dynamically attached to the virtual machine can be attached through a network (using protocols such as iSCSI or Fibre Channel which reference storage by LUNs, or logical unit numbers). In another embodiment, the storage dynamically attached to the virtual machine is directly attached from physical volumes (raw device mapping) such as a hard disk and hard disk partitions and the hypervisor with pass through access from the virtual machine directly to the hardware. In another embodiment, the storage dynamically attached to the virtual machine can be a virtual device represented by a file (an ISO representing a virtual CD-ROM or a virtual hard disk file such as the VMDK and VHD file formats which represent a disk).

The storage dynamically attached to the virtual machine does not need to be contained within a single physical device or single virtual device represented by a file. The storage may be in the form of different virtual hard disk files or physical devices attached simultaneously which represent "physical volumes" within the virtual machine. These physical volumes will be composed of logical volumes. This approach, known as storage virtualization, allows logical volumes to be abstracted from the underlying physical storage. A logical volume (itself containing a file system) spread out across multiple physical volumes can lead to improved redundancy and performance where logical volumes. Technology to provide this storage virtualization, such as Redundant Array of Independent Disks (RAID for short), logical volumes, and physical volumes, are well-known to skilled artisans and outside the scope of this invention.

Hereafter, "volume" and "volumes" will be used to refer to logical storage volumes visible within the virtual machine including (1) the primary volume containing the operating system (typically the C: drive for the Windows® operating system) and (2) any dynamically attached storage previously described above.

Whenever the user logs off, the volume is detached. When the user logs into a different virtual machine, the user's writable volume is attached to the new virtual machine. As such, the user's volume containing the user's data and user-installed applications will remain available in each virtual machine the user uses.

In another embodiment, if a volume that is not read-only and needs to be used simultaneously from two different virtual machines (for example, because the user logs in to two separate virtual machines), a new volume can be created that is a copy-on-write linked clone. If a user logs in to two separate virtual machines, each would receive a separate linked clone of the user's writable volume. Once the user logs off the virtual machine, the data on the linked clone would be reintegrated into the original volume. If the changes made by the user on the two different virtual machines conflict (such that the changes to the two separate linked clones modify the same data), a software policy can determine the appropriate way to resolve the conflict. A software policy for conflict resolution could be, for example, to favor newer changes such that the linked clone with the most recent modification will pre-empt any older, overlapping modification from a different linked clone.

FIG. 4 illustrates an operation 400 of a data management system according to one example. In FIG. 4, operation 400 begins by initializing the provisioning of a virtual machine (step 410). This initialization could come in response to an operating system upgrade triggering event, could come in response to a user choosing to create a new virtual machine, or could come in response to any other recognizable event to initialize provisioning of a virtual machine.

Next, at step 420, the system will monitor for the provisioning of the virtual machine to be complete. This completion may occur when an operating system has been loaded on the virtual machine and the virtual machine is executing the operating system. In at least one example, the operating system of the new virtual machine may include an upgraded or updated operating system of an initial virtual machine.

Thereafter, upon the virtual machine being provisioned, one or more applications may be dynamically attached to the virtual machine such that the applications will be available without installation (step 430). In at least one example, the system may modify registry keys to make the application available without installation as further discussed in previous figures. These dynamically attached applications may include applications from an initial virtual machine or any other applications.

Once attached, in at least one example, the one or more applications may begin executing.

FIG. 5 illustrates an operation 500 of a data management system according to one example. In FIG. 5, operation 500 begins by monitoring for an operating system upgrade triggering event from an initial virtual machine (step 510). This upgrade triggering event could include a user selecting to upgrade or update the operating system from within an initial virtual machine, an administrator requesting an upgrade or update for an initial virtual machine, an operating system upgrade or update becoming available for an initial virtual machine, or any other method of requesting an upgrade or update for an initial virtual machine.

Once an operating system upgrade triggering event has been detected, the system will initialize provisioning of a new virtual machine (step 520). In at least one example, this new virtual machine may contain an upgraded or updated operating system of the initial virtual machine. In another example, the new virtual machine may clone the initial virtual machine including the initial virtual machine operating system then may upgrade or update the operating system on the new virtual machine.

Finally, at step 530, the system will monitor for the new virtual machine provisioning to be completed. In at least one example, the completion includes that the virtual machine is executing the fully upgraded or updated operating system.

Figure 6:
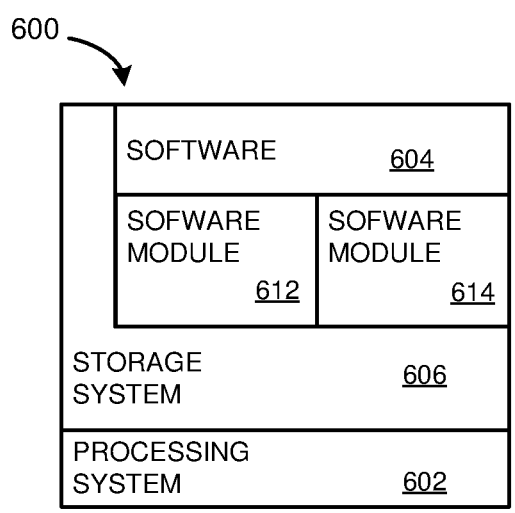
FIG. 6 illustrates a data management computing system according to one example.

FIG. 6 illustrates a data management computing system 600 according one example. Computing system 600 includes processing system 602, storage system 606, software 604, software module 612, and software module 614. Software module 612, in the present example, is capable of executing operation 400 and software module 614 is capable of executing operation 500. Processing system 602 loads and executes software 604 from storage system 606, including software modules 612 and 614. When executed by computing system 600, software modules 612 and 614 direct processing system 602 to execute operation 400, operation 500, or a combination of operation 400 and operation 500.

Although computing system 600 includes two software modules in the present example, it should be understood that any number of software modules could be used to provide the same operation.

Referring still to FIG. 6, processing system 602 can comprise a microprocessor and other circuitry that retrieves and executes software 604 from storage system 606. Processing system 602 can be implemented within a single processing device, but can also be distributed across multiple processing devices or sub-systems that cooperate in executing program instructions. Examples of processing system 602 include general purpose central processing units, application specific processors, and logic devices, as well as any other type of processing device, combinations of processing devices, or variations thereof.

Storage system 606 can comprise any storage media readable by processing system 602, and capable of storing software 604. Storage system 606 can include volatile and nonvolatile, removable and non-removable media implemented in any method or technology for storage of information, such as computer readable instructions, data structures, program modules, or other data. Storage system 606 can be implemented as a single storage device but may also be implemented across multiple storage devices or sub-systems. Storage system 606 can comprise additional elements, such as a controller, capable of communicating with processing system 602.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory hardware storage media. In some implementations, at least a portion of the storage media may be transitory. It should be understood that in no case is the storage media a propagated signal.

In some examples, computing system 750 could include a user interface The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The aforementioned user input and output devices are well known in the art and need not be discussed at length here.

It should be understood that although computing system 710 is shown as one system, the system could comprise one or more systems to execute the aforementioned operations.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computing apparatus comprising:
   a storage device;
   a processing system operatively coupled to the storage device;
   program instructions stored on the storage device that, when executed by the processing system, direct the processing system to at least:
      in response to a triggering event to create a second virtual machine from a first virtual machine, provision the second virtual machine;
      identify at least one application available for execution on the first virtual machine via application files executable from at least one application volume attached to the first virtual machine; and
      in response to provisioning the second virtual machine, attach the at least one application volume to the second virtual machine to make the application files associated with the at least one application executable from the at least one application volume by the second virtual machine, wherein the at least one application volume is attached to both the first virtual machine and the second virtual machine for at least a period of time.

2. The computing apparatus of claim 1, wherein the triggering event comprises an attempt to modify software on the first virtual machine from a first version of the software to a modified version of the software, and wherein provisioning the second virtual machine comprises provisioning the second virtual machine with the modified version of the software.

3. The computing apparatus of claim 2, wherein the modified version of the software comprises an updated or upgraded version of the software.

4. The computing apparatus of claim 2, wherein the software comprises an operating system.

5. The computing apparatus of claim 2, wherein provisioning the second virtual machine with the modified version of the software comprises initiating execution of the second virtual machine with the modified version of the software.

6. The computing apparatus of claim 2, wherein provisioning the second virtual machine with the modified version of the software comprises:
   creating the second virtual machine with the first version of the software; and
   modifying the first version of the software on the second virtual machine to the second version of the software.

7. The computing apparatus of claim 1, wherein the program instructions further direct the processing system to:
   after attaching the at least one application volume to the second virtual machine, initiate execution of the at least one application on the second virtual machine from the at least one application volume.

8. The computing apparatus of claim 1, wherein the program instructions further direct the processing system to detach the at least one application volume from the first virtual machine, wherein detaching the at least one application volume comprises preventing future execution of the at least one application on the first virtual machine.

9. The computer apparatus of claim 1, wherein attaching the at least one application volume to the second virtual machine to make the application files associated with the at least one application executable from the at least one application volume by the second virtual machine comprises attaching the at least one application volume to the second virtual machine to make the application files associated with the at least one application executable from the at least one application volume by the second virtual machine without executing an install operation for the at least one application on the second virtual machine.

10. A method of operating a data management system, the method comprising:
    in response to a triggering event to create a second virtual machine from a first virtual machine, provisioning the second virtual machine;
    identifying at least one application available for execution on the first virtual machine via application files executable from at least one application volume attached to the first virtual machine;
    in response to provisioning the second virtual machine, attaching the at least one application volume to the second virtual machine to make the application files associated with the at least one application executable from the at least one application volume by the second virtual machine, wherein the at least one application volume is attached to both the first virtual machine and the second virtual machine for at least a period of time.

11. The method of claim 10, wherein the triggering event comprises an attempt to modify software on the first virtual machine from a first version of the software to a modified version of the software, and wherein provisioning the second virtual machine comprises provisioning the second virtual machine with the modified version of the software.

12. The method of claim 11, wherein the modified version of the software comprises an updated or upgraded version of the software.

13. The method of claim 11, wherein the software comprises an operating system.

14. The method of claim 11, wherein provisioning the second virtual machine with the modified version of the software comprises initiating execution of the second virtual machine with the modified version of the software.

15. The method of claim 10, wherein provisioning the second virtual machine with the modified version of the software comprises:
    creating the second virtual machine with the first version of the software; and
    modifying the first version of the software on the second virtual machine to the second version of the software.

16. The method of claim 10 further comprising:
    after attaching the at least one application volume to the second virtual machine, initiating execution of the at least one application on the second virtual machine from the at least one application volume.

17. The method of claim 10 further comprising detaching the at least one application volume from the first virtual machine, wherein detaching the at least one application volume comprises preventing future execution of the at least one application on the first virtual machine.

18. The method of claim 10, wherein attaching the at least one application volume to the second virtual machine to make the application files associated with the at least one application executable from the at least one application volume by the second virtual machine comprises attaching the at least one application volume to the second virtual machine to make the application files associated with the at least one application executable from the at least one application volume by the second virtual machine without executing an install operation for the at least one application on the second virtual machine.

19. An apparatus comprising:

a storage device;

program instructions stored on the storage device that, when executed by a processing system, direct the processing system to:

in response to a triggering event to create a second virtual machine from a first virtual machine, provision the second virtual machine;

identify at least one application available for execution on the first virtual machine via application files executable from at least one application volume attached to the first virtual machine; and in response to provisioning the second virtual machine, attach the at least one application volume to the second virtual machine to make the application files associated with the at least one application executable from the at least one application volume by the second virtual machine, wherein the at least one application volume is attached to both the first virtual machine and the second virtual machine for at least a period of time.

20. The apparatus of claim 19, wherein the program instructions further direct the processing system to:

after attaching the at least one application volume to the second virtual machine, initiate execution of the at least one application on the second virtual machine from the at least one application volume.

\* \* \* \* \*